United States Patent
Konkus et al.

(10) Patent No.: US 10,015,242 B2
(45) Date of Patent: Jul. 3, 2018

(54) SYSTEM AND METHOD FOR SUPPORTING RESTFUL MANAGEMENT IN A MULTITENANT APPLICATION SERVER ENVIRONMENT

(71) Applicant: ORACLE INTERNATIONAL CORPORATION, Redwood Shores, CA (US)

(72) Inventors: Loren Konkus, Novi, MI (US); Thomas Moreau, Candia, NH (US); Jason Lee, Oklahoma City, OK (US); Andriy Zhdanov, Prague (CZ)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 196 days.

(21) Appl. No.: 14/748,011

(22) Filed: Jun. 23, 2015

(65) Prior Publication Data
US 2015/0373097 A1 Dec. 24, 2015

Related U.S. Application Data

(60) Provisional application No. 62/016,060, filed on Jun. 23, 2014, provisional application No. 62/054,914, filed on Sep. 24, 2014.

(51) Int. Cl.
G06F 15/16 (2006.01)
H04L 29/08 (2006.01)

(52) U.S. Cl.
CPC .......... H04L 67/1025 (2013.01); H04L 67/14 (2013.01); H04L 67/142 (2013.01)

(58) Field of Classification Search
None
See application file for complete search history.

(56) References Cited

U.S. PATENT DOCUMENTS

| | | | | |
|---|---|---|---|---|
| 8,166,152 | B1* | 4/2012 | Delcheva | G06F 11/302 707/634 |
| 2002/0066033 | A1* | 5/2002 | Dobbins | G06Q 30/0277 726/4 |
| 2002/0184312 | A1* | 12/2002 | Chen | G06F 17/30017 709/205 |
| 2003/0229623 | A1* | 12/2003 | Chang | G06F 21/6218 |
| 2004/0194066 | A1* | 9/2004 | Frey | H04N 1/00957 717/127 |
| 2004/0215725 | A1* | 10/2004 | Love | G06F 9/546 709/206 |
| 2005/0022006 | A1* | 1/2005 | Bass | H04L 63/102 726/4 |

(Continued)

Primary Examiner — Phyllis A Book
(74) Attorney, Agent, or Firm — Tucker Ellis LLP

(57) ABSTRACT

In accordance with an embodiment, a system and method for supporting RESTful management in an application server environment for operating application software includes an interface configured to receive input for interacting with the application server environment. When a request to manage the application server environment is received, REST resources are dynamically generated using bean trees and other bean information within the application server environment. The REST resources are then usable as input to the interface to manage the application server environment.

14 Claims, 8 Drawing Sheets

(56) References Cited

U.S. PATENT DOCUMENTS

| | | | | |
|---|---|---|---|---|
| 2005/0216585 A1* | 9/2005 | Todorova | ............... | H04L 41/22 |
| | | | | 709/224 |
| 2005/0216860 A1* | 9/2005 | Petrov | ................ | H04L 12/2602 |
| | | | | 715/810 |
| 2007/0044144 A1* | 2/2007 | Knouse | .............. | H04L 63/0815 |
| | | | | 726/8 |
| 2008/0301627 A1* | 12/2008 | Stark | ........................ | G06F 8/24 |
| | | | | 717/106 |
| 2009/0320045 A1* | 12/2009 | Griffith | .................. | H04L 67/34 |
| | | | | 719/315 |
| 2014/0006626 A1* | 1/2014 | Breiter | ............... | H04L 41/0806 |
| | | | | 709/226 |
| 2014/0189681 A1* | 7/2014 | Bryan | .............. | H04L 29/06326 |
| | | | | 717/176 |
| 2014/0201242 A1* | 7/2014 | Bakthavachalam | .. | G06F 21/604 |
| | | | | 707/785 |

* cited by examiner

SYSTEM AND METHOD FOR SUPPORTING RESTFUL MANAGEMENT IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR SUPPORTING RESTFUL MANAGEMENT IN A MULTITENANT APPLICATION SERVER ENVIRONMENT", Application No. 62/016,060, filed Jun. 23, 2014, and U.S. Provisional Application titled "SYSTEM AND METHOD FOR SUPPORTING RESTFUL MANAGEMENT IN A MULTITENANT APPLICATION SERVER ENVIRONMENT", Application No. 62/054,914, filed Sep. 24, 2014; and is related to U.S. Patent Application titled "SYSTEM AND METHOD FOR SUPPORTING MULTITENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to environments for operating application software, and are particularly related to systems and methods for supporting RESTful management in an application server environment.

BACKGROUND

Software application servers, examples of which include Oracle WebLogic Server (WLS) and Glassfish, generally provide a managed environment for running enterprise software applications. An application server (e.g., WLS) configuration system provides internal trees of java beans for configuring and monitoring the application server. These beans are often exposed to administrators and customers using an interface such as JMX to enable management of the application server configuration system. Such interfaces can require a significant amount of resources and are considered relatively heavy-weight and slow.

SUMMARY

In accordance with an embodiment, a system and method for supporting RESTful management in an application server environment for operating application software includes an interface configured to receive input for interacting with the application server environment. When a request to manage the application server environment is received, REST resources are dynamically generated using bean trees and other bean information within the application server environment. The REST resources are then usable as input to the interface to manage the application server environment.

In accordance with an embodiment, the application server environment includes a plurality of deployable resources and one or more resource group templates. Each resource group template defines a grouping of the plurality of deployable resources within a domain of the application server environment. Each resource group template can include one or more related applications together with resources upon which those applications depend. The dynamically generated REST resources are usable as input to the interface to manage the one or more related applications.

In accordance with an embodiment, one or more partitions are defined within the application server environment. Each partition provides an administrative and runtime subdivision of the domain. In accordance with an embodiment, the REST resources are dynamically generated based on a role requesting to manage the application server environment. Where a role is limited to a partition from the one or more partitions, the REST resources dynamically generated are limited to managing the partition.

In accordance with an embodiment, the system is configured to receive a bulk access query from a caller and to return a part of a bean tree to the caller in one request via a bulk access query API. The caller can define which part of the bean tree should be returned. In accordance with an embodiment, the system includes an extension mechanism configured to weave hand-coded REST resources and customization into trees of the dynamically generated REST resources.

In accordance with an embodiment, the application server environment includes an administration server and a plurality of managed servers. When the REST resources are used as input to the interface to manage the application server environment, the interface interacts with the administration server. However, when the administration server is unavailable, the REST resources are usable to directly interact with a managed server from the plurality of manager servers.

DETAILED DESCRIPTION

In accordance with an embodiment, described herein is a system and method for supporting RESTful management in an environment for operating application software. In accordance with an embodiment, management components, such as beans, are used by application server (e.g., WLS) components to manage configuration settings and to monitor and manage running servers. Application server beans are derived from Java interfaces written by the developers. In accordance with an embodiment, the system and method can dynamically generate REST resources using bean trees and other bean information within the environment. The REST resources are then usable as input to an interface to manage the environment. The REST resources can provide an alternative to JMX for managing the application server.

Application Server (e.g., Multi-Tenant, MT) Environment

Figure 1:
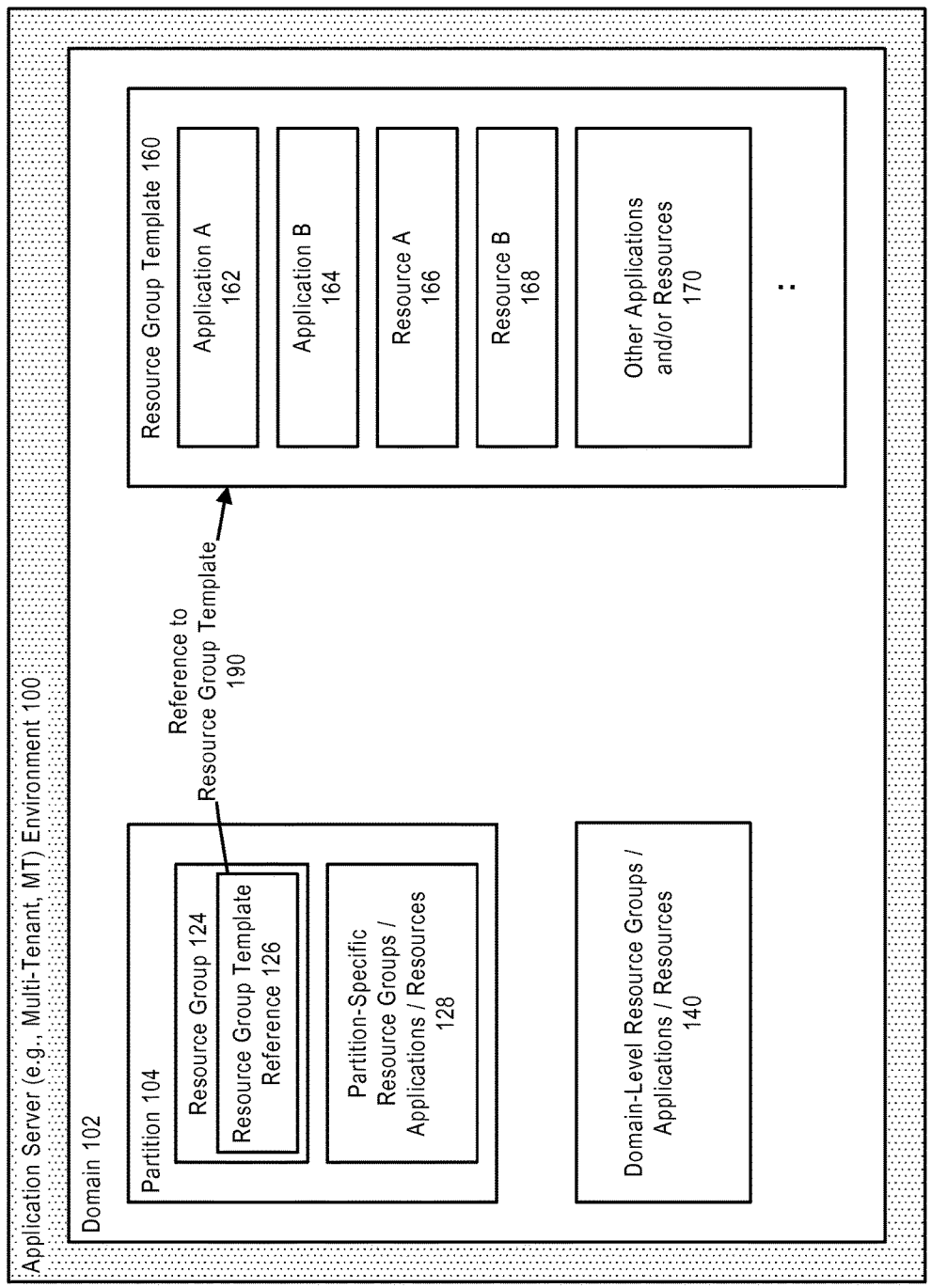
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
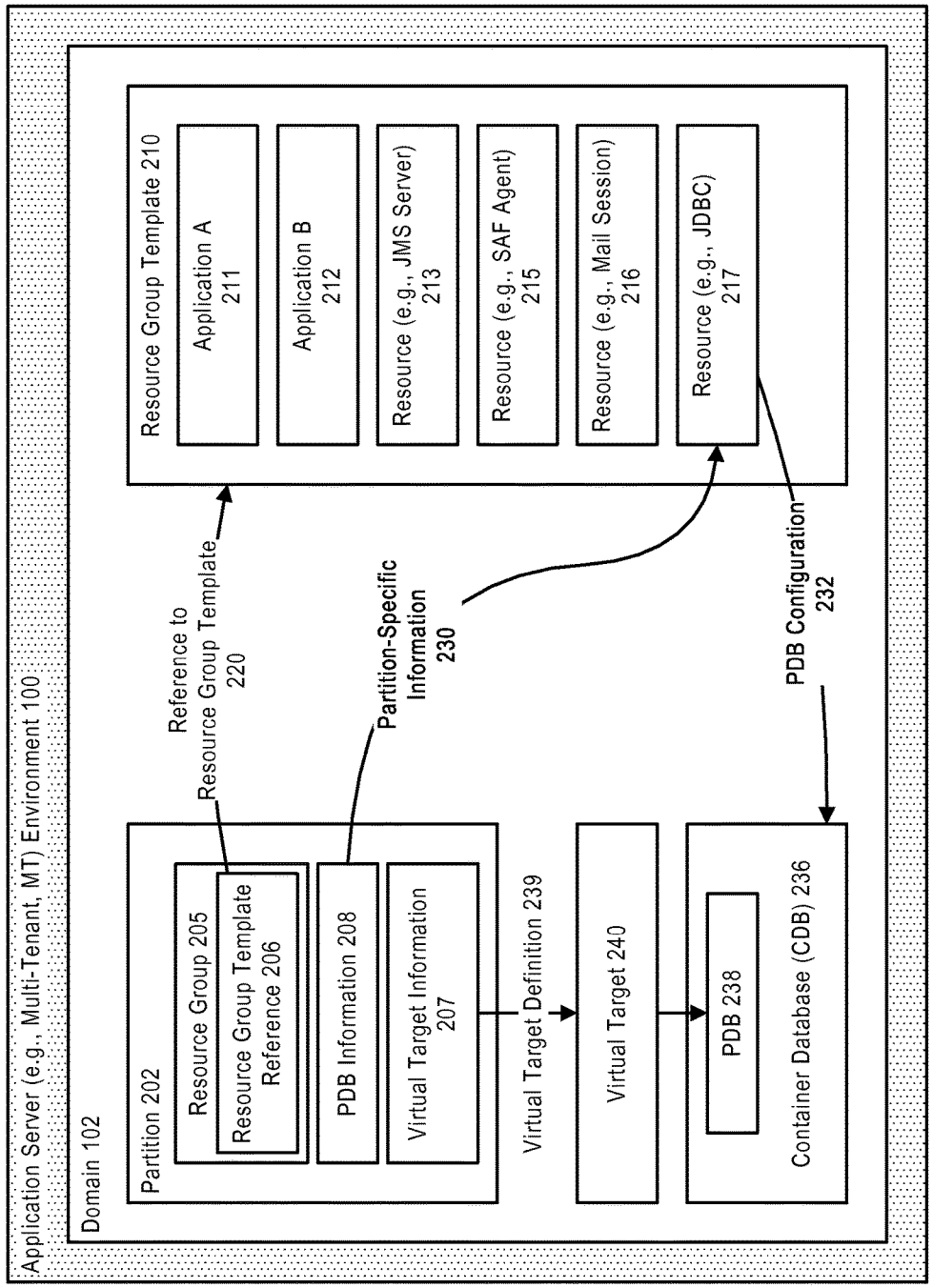
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
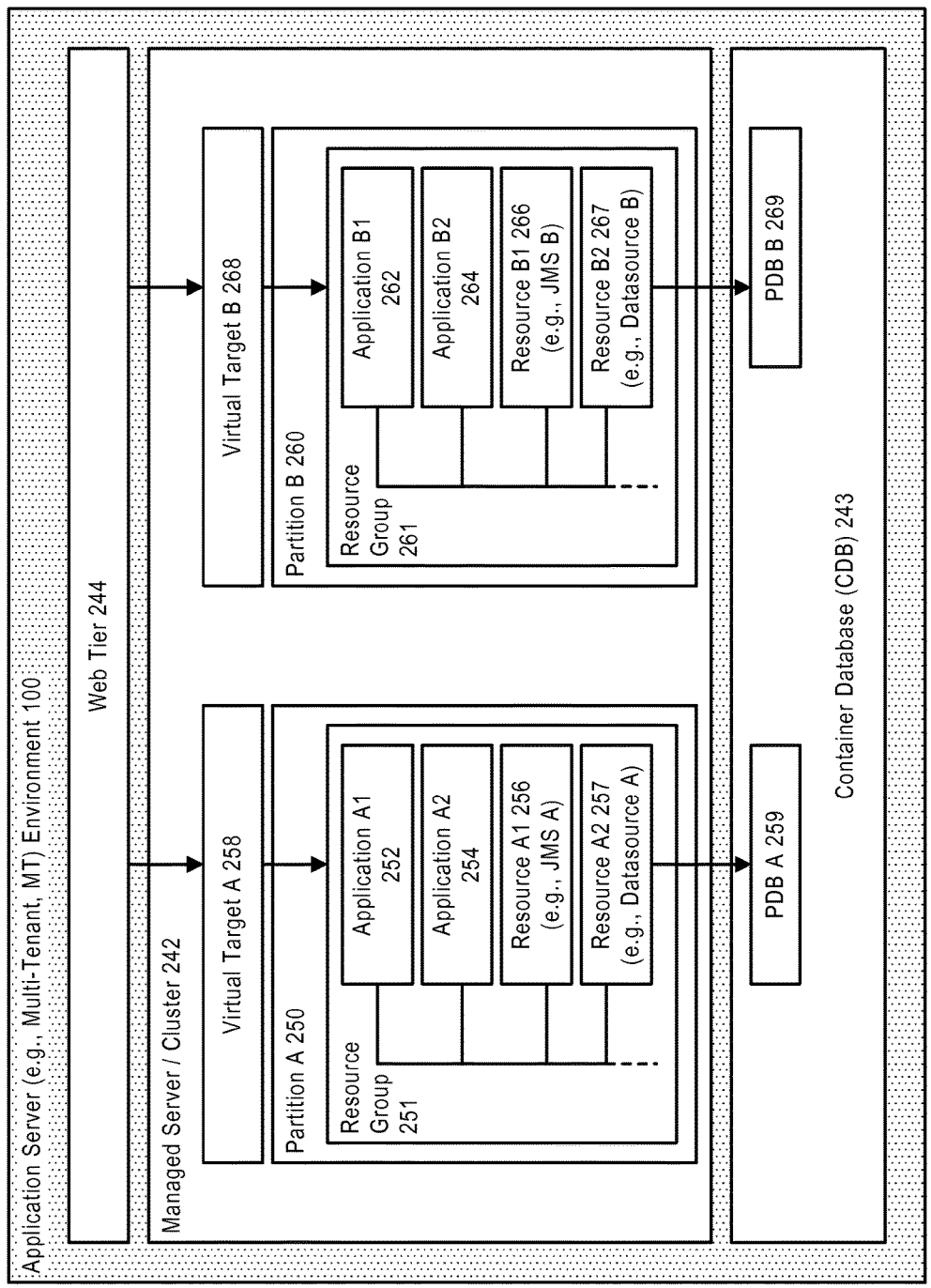
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
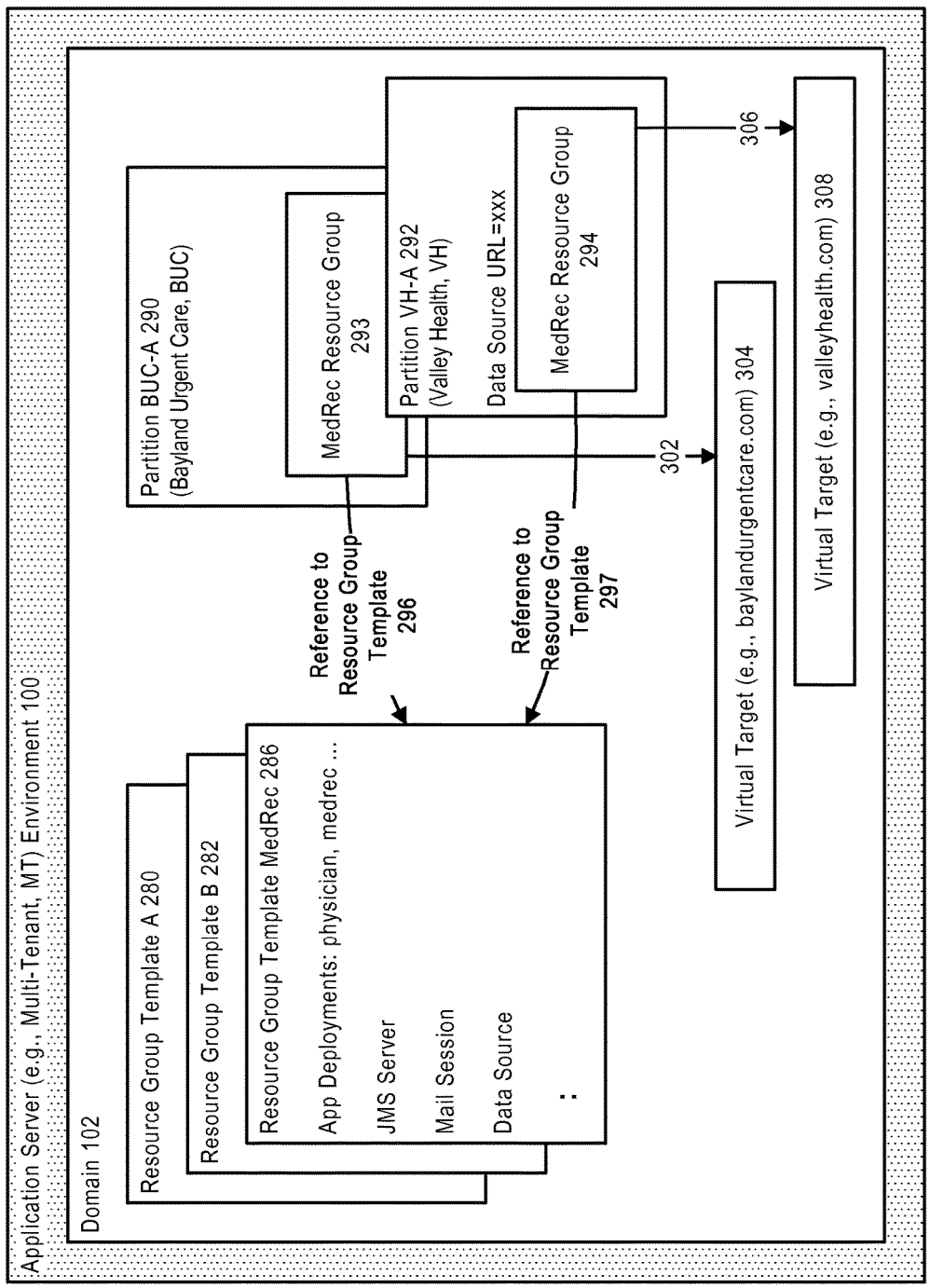
FIG. 4 illustrates an exemplary use of resource group templates, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
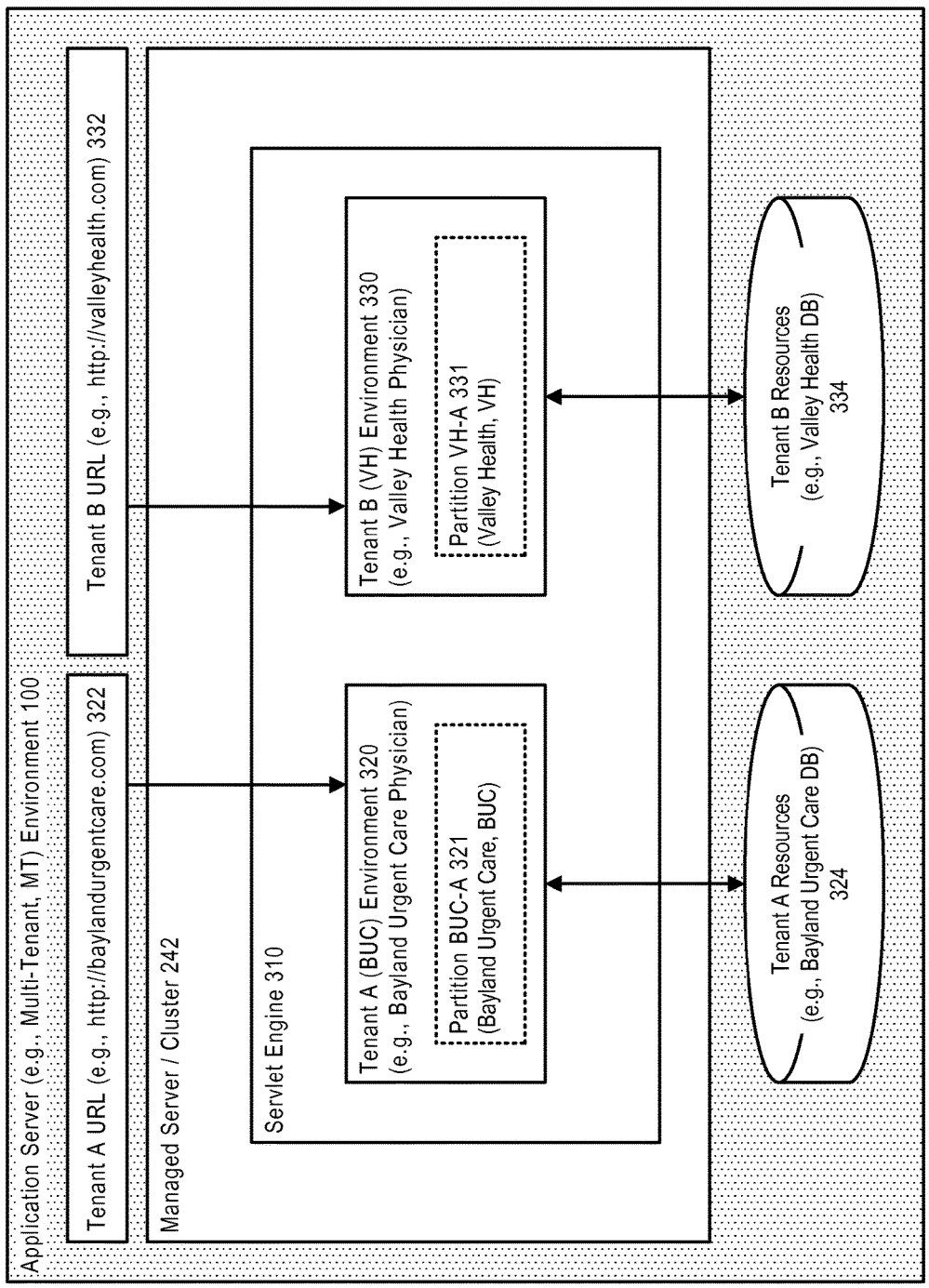
FIG. 5 illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

RESTful Management

In accordance with an embodiment, a system can include support for RESTful management in an environment for deploying and executing software applications, including a partitionable environment such as a multi-tenant cloud or application server environment.

In accordance with an embodiment, an application server (e.g., WLS) configuration system provides internal trees of Java beans for configuring and monitoring the application server. Currently, these beans may be exposed to customers via JMX. In accordance with an embodiment, these beans can also be exposed to customers via dynamically generated REST interfaces.

Figure 6:
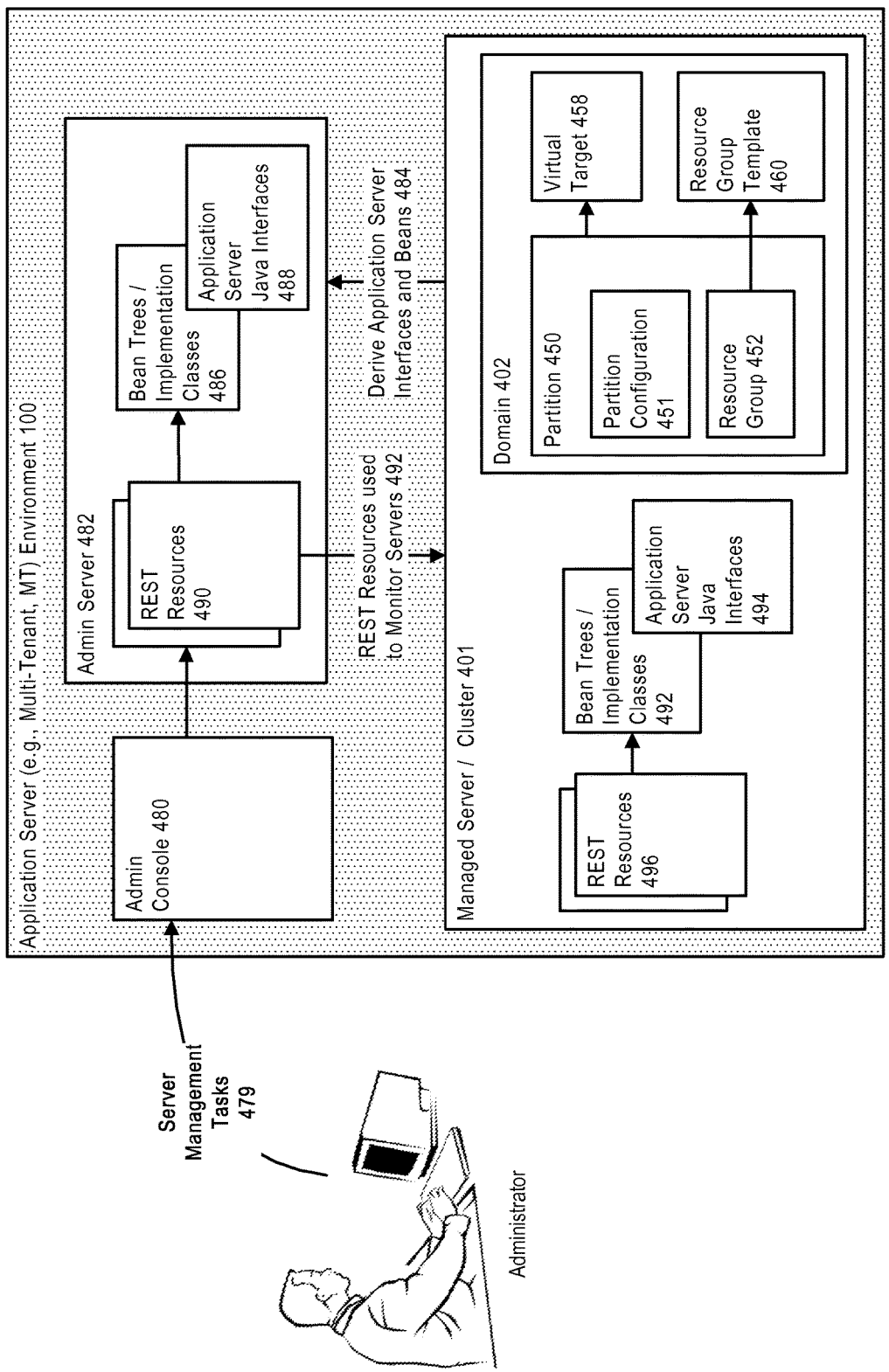
FIG. 6 illustrates a system for supporting RESTful management in an environment for operating application software, in accordance with an embodiment.

FIG. 6 illustrates the use of RESTful management in an application server, cloud or other environment, in accordance with an embodiment. As shown, an application server (e.g., multi-tenant MT) environment 100, or other computing environment which enables the deployment and executing of software programs, can be configured so as to be manageable using a REST application program interface (API). REST resources are dynamically generated upon the initiation of an edit session, for example, or upon the initiation of a session to perform some other administrative task.

As shown in FIG. 6, the application server environment includes a managed server and/or server cluster 401 comprising a domain 402 within which is created a partition 450 having a partition configuration 451. Artifacts can be created within the partition including, for example, a resource group 452 which references a resource group template 460. The resource group can be pointed to a virtual target 458. As discussed above, the resource group template can include a collection of deployable resources. For example, the resource group template can include one or more application deployments together with deployable resources for supporting the one or more application deployments. The configuration of the application server environment illustrated in FIG. 6 is provided merely by way of example. In accordance with other embodiments, environments including different domain, partition, and resource group configurations can be provided.

In accordance with an embodiment, an administrator (or other user) can access the application server environment via a client, e.g. an administration (admin) console 480, which calls the REST API to interact with an admin server 482 for administering the application server environment. In response, REST resources 490 on the admin server can include dynamically generated bean trees/implementation classes 486 and application server Java interfaces 488 derived from application server interfaces and beans 484, as further explained below. When configuring the managed server and/or server cluster, the REST resources on the admin server talk to the bean trees on the admin server, while when monitoring 492 the managed server and/or server cluster the REST resources on the admin server call REST resources 496 on the managed server and/or server cluster, e.g. to gather monitoring statistics from the managed server or across the server cluster. The REST resources on the managed server and/or server cluster can likewise include dynamically generated bean trees/implementation classes 492 and application server Java interfaces 494.

In accordance with an embodiment, the REST resources provide a REST interface that enables the administrator or other user to perform server management tasks 479 using REST-based protocol. In accordance with an embodiment, the REST resources can be dynamically generated and used, via the client (e.g. the admin console) calling the REST API, based on the role of a user of the client, allowing the user to manage only those servers and/or partitions for which she has access permission. While the administrator is shown accessing the application server environment via an admin console, the REST API can be a public API that is used directly, e.g. by customers. A number of common tools can be used to call the REST API, e.g. the UNIX 'curl' command, a browser, the JAX-RS client API for JDK, etc. An admin console can be merely one of many consumers of the REST API.

Figure 7:
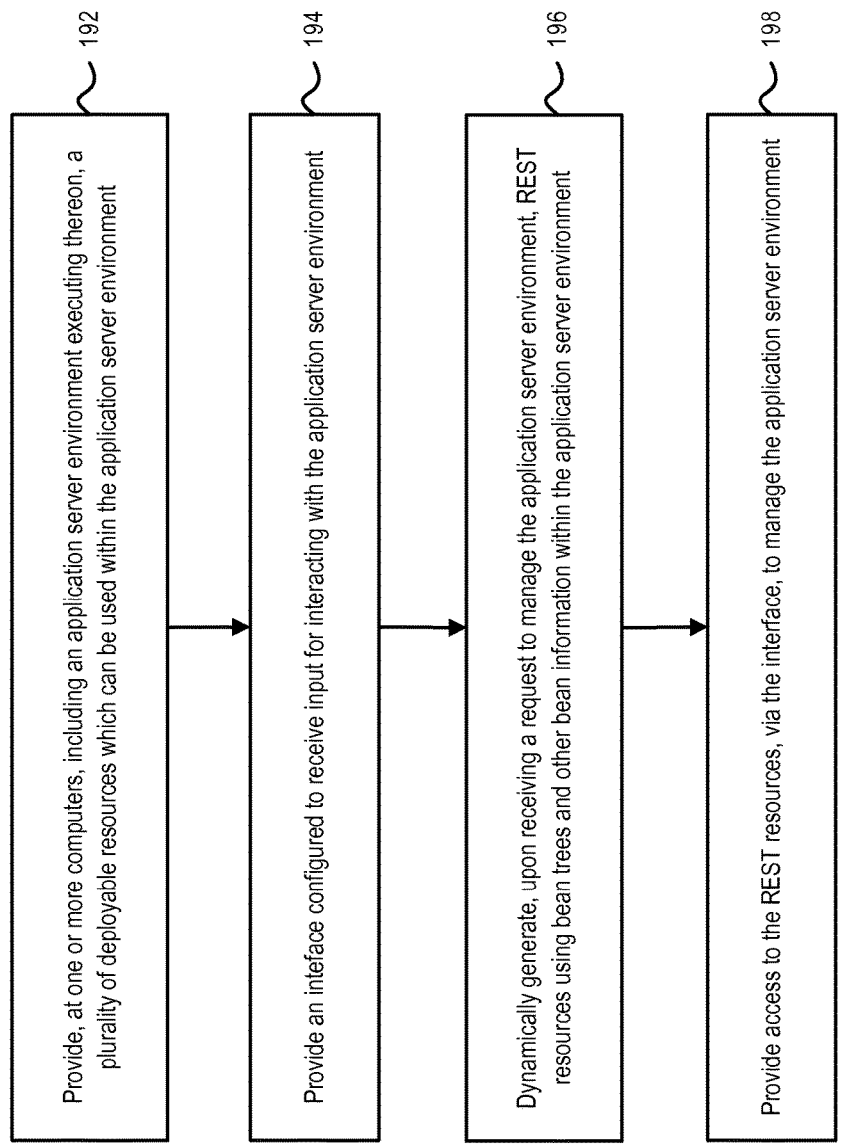
FIG. 7 is a flowchart illustrating a method for supporting RESTful management in an environment for operating application software, in accordance with an embodiment.

FIG. 7 is a flowchart that illustrates a method for supporting RESTful management in an application server environment, in accordance with an embodiment. In accordance with an embodiment, at step 192, an application server environment is provided, together with deployable resources usable within the environment.

At step 194, an interface is provided, which is usable to receive input for interacting with the application server environment.

At step 196, upon receiving a request to manage the application server environment, REST resources are dynamically generated using bean trees and other bean information within the application server environment.

At step 198, access is provided to the REST resources, via the interface, to manage the application server environment.

Generated REST API for Application Server Bean Trees

In accordance with an embodiment, application server (e.g., WLS) beans are used extensively by application server components to manage configuration settings and to monitor and manage the running servers. The application server beans are derived from java interfaces that application server developers write.

In accordance with an embodiment, these interfaces follow application server-specific patterns and use application server-specific javadoc tags. The application server build (beangen) parses these interfaces and generates bean implementation classes as well as bean infos that provide metadata about the bean types. At runtime, the application server uses these classes to construct internal trees of java beans that can be used to configure and monitor the system.

In accordance with an embodiment, the application server beans, for the most part, can be mapped to REST. In accordance with an embodiment, the system can dynamically generate REST resources, incrementally and on-demand at runtime, by using the bean trees and bean infos. The generated REST resources provide an alternative to JMX for managing the application server. The generated REST resources are lighter weight than JMX since they are stateless (except for caching some info about the bean types). The generated REST resources can be used without starting JMX (which is fairly expensive), since they are layered directly on the bean trees.

Bean Overview

In accordance with an embodiment, there are two kinds of beans: configuration—used to configure the application server; and runtime—used to monitor the application server and for some operation control (e.g. starting and stopping servers, shrinking data source connection pools).

In accordance with an embodiment, an application server, e.g., WLS, provides the following bean trees:

edit—only available on the admin server, used to modify the configuration (e.g. config.xml).

runtime—available on every server, used to view the configuration that server is using, and to access its monitoring data.

domain runtime—only available on the admin server, shadows the runtime beans of all of the running servers, provides single point of access for monitoring.

In accordance with an embodiment, an application server, e.g., WLS, also provides services. For example, the edit service can be used to manage the configuration lock (which is required for editing configuration beans).

The application server beans naturally form trees. There are several kinds of parent/child (containment) relationships:

writable collections—e.g. a domain bean has a collection of server beans.

mandatory singletons—e.g. a server bean always has an ssl bean which is automatically created and cannot be deleted.

optional singletons—e.g. an overload protection bean can optionally have a server failure trigger bean.

In accordance with an embodiment, beans can include properties (generally scalars, strings, arrays), references to other beans, and operations (e.g. to start a server). Each child has a unique identity within the collection (e.g. each network channel has a name that is unique within its server). Most collections are homogeneous (e.g. a domain's applications) though a few are heterogeneous (e.g. a security realm's authentication providers). Most contained collections are unordered (e.g. servers) though a few are ordered (e.g. authentication providers).

Exemplary Implementation of Dynamically Generated REST Resources

In accordance with an embodiment, the system can dynamically generate REST resources, incrementally and on-demand at runtime. Dynamically generated REST resources can be implemented as follows.

In accordance with an embodiment, patterns can be used to map application server beans to REST interfaces. The patterns typically follow a style guide, for example, the Oracle REST style guide.

In accordance with an embodiment, request bodies and response bodies can use JSON. A standard set of properties for response bodies can include "items" to return information about collection, "links" to return links to related resources, and "messages" to return success, warning and failure messages. Standard HTTP response codes can include "201" for successful creation, "200" for other successes, "404" for not found, "400" for user input errors, "500" for internal server errors.

Root Resources

In accordance with an embodiment, resource URIs contain version numbers and support a version named "latest". Some or all of the REST resources can be versioned. The newest version of a REST resource can include the version number and a "latest" version designation.

In accordance with an embodiment, the administration server and each running managed server can host a REST web application that runs on each server's administrative port. Each server can have a context root, e.g. "management".

In accordance with an embodiment, the administration server can include the root resources for a WLS application server listed in Table 1.

TABLE 1

| URI | Description | Corresponding Bean Tree |
| --- | --- | --- |
| management/weblogic/<version>/edit | Edits the configuration | admin server's edit tree's domain bean |
| management/weblogic/<version>/serverConfig | Views the configuration that the admin server is currently running against | admin server's server runtime tree's domain bean |
| management/weblogic/<version>/serverRuntime | Monitors the admin server | admin server's server runtime tree's server runtime bean |
| management/weblogic/<version>/domainConfig | Views the last activated WLS configuration | admin server's domain runtime tree's domain bean |
| management/weblogic/<version>/domainRuntime | Monitors the entire WLS domain | admin server's domain runtime tree's domain runtime bean |
| management/weblogic/<version>/domainRuntime/serverRuntimes | Monitors all the running servers in the WLS domain via the admin server | each running server's server runtime tree's server runtime bean |
| management/weblogic/<version>/domainRuntime/serverRuntimes/<serverName> | Monitors a specific running server in the WLS domain via the admin server | the specific server's server runtime tree's server runtime bean |

In accordance with an embodiment, the managed servers can include the root resources for a WLS application server listed in Table 2.

TABLE 2

| URI | Description | Corresponding Bean Tree |
| --- | --- | --- |
| management/weblogic/<version>/serverConfig | Views the configuration that managed server is currently running against | managed server's server runtime tree's domain bean |
| management/weblogic/<version>/serverRuntime | Monitors that managed server | managed server's server runtime tree's server runtime bean |

The URLs on managed servers resemble the URLs on the administration server, however the host and port will be different. For example, to view an administration server's server runtime, the following can be used:
curl . . . -X GET http://adminHost:7001/management/weblogic/latest/serverRuntime To view a managed server's server runtime, the following can be used:
curl . . . -X GET http://managed1Host:7002/management/weblogic/latest/serverRuntime Naming Conventions In accordance with an embodiment, application server bean property names can be mapped to names in the REST URLs and JSON object properties. Application server property names usually start upper case (e.g. Domain, JDBCDataSource, ServerRuntime) while the Oracle REST naming conventions usually use camel case (e.g. domain, JDBCDataSource, serverRuntime). The generated REST resources can contain a simple algorithm to handle this. For example, if the first character is upper case and the second character is lower case, the first character is converted to lower case. In accordance with an embodiment, a new REST-specific javadoc tag can be added to let the application server bean property control its REST name.

URIs

In accordance with an embodiment, for an application server, e.g. WLS, each bean is mapped to a separate REST resource. Contained collections and operations are also mapped to separate resources. Beans are either "root resources" (e.g. domain resources), "contained collection children" (e.g. server resources) or "contained singleton children" (e.g. a server's SSL configuration).

In accordance with an embodiment, each contained collection bean property maps to a URI for the entire collection as well as to a URI for each child, for example as follows:

<parent>/<collectionPropertyName> - manages the entire collection, e.g. .../edit/servers
<parent>/<collectionPropertyName>/<childName> - manages a child in the collection e.g. .../edit/servers/Server-0

In accordance with an embodiment, each contained singleton bean property maps to its own URI. For example, a server's SSL bean maps to . . . /edit/servers/<serverName>/SSL.

In accordance with an embodiment, if a contained bean property is creatable, then 'create-form' resources are also provided which return a template JSONObject with default values to help create the new resource. The client can thus GET the create form, fill in the values, then POST the form back to create the new resource. The URIs of the create-form resources are <parent>/<singularCollectionPropertyName>CreateForm, e.g.:

.../edit/serverCreateForm
.../edit/securityConfiguration/realms/myrealm/RDBMSSecurityStoreCreateForm In accordance with an embodiment, each bean operation maps to its own URI. For example, . . . /domainRuntime/serverRuntimes/<serverName>/shutdown is used to shut down a specific server.

In accordance with an embodiment, most of the application server bean operations are used to create/delete/list and find contained beans. These operations are handled separately in REST.

JSON

In accordance with an embodiment, REST can map various Java types that the application beans use (e.g. their properties, operation arguments and return types) to JSON.

In accordance with an embodiment, Java strings and scalars are mapped to their natural JSON equivalent for a WLS application server, as listed in Table 3.

TABLE 3

| Java | JSON | Example |
| --- | --- | --- |
| java.lang.String | string or null | "Foo" -> "Foo" |
| | | null -> null |
| Int | number | 7001 -> 7001 |
| java.lang.Integer | | |
| long | | |
| java.lang.Long | | |
| Float | number | 1.23 -> 1.23 |
| java.lang.Float | | |
| double | | |
| java.lang.Double | | |
| boolean | boolean | true -> true |
| java.lang.Boolean | | |

In accordance with an embodiment, most underlying mbeans use primitive types, such as boolean and int, instead of their corresponding classes like Boolean and Integer, which can also be null. REST mapping can return a JSON null to the client if an mbean returns a null, and throw a BAD_REQUEST if the client tries to send in a null.

In accordance with an embodiment, non-null Java arrays are mapped to JSON arrays. Null Java arrays are mapped to a JSON null.

In accordance with an embodiment, each application server bean can be uniquely identified within its bean tree by the trailing part of its URI, after the version. For example, "edit/machines/Machine-0" identity can be mapped to a JSON string array, with one string for each path segment past the root resource of the tree, for example:

["machines", "Machine-0"]

In accordance with an embodiment, some application server bean properties contain references to other application server beans. Operation arguments can also contain references to other operation arguments and return types can contain references to other return types. For example, a Server bean can contain a reference to a Machine bean, and a Deployment bean can contain a reference to an array of Target beans.

In accordance with an embodiment, singleton references (e.g. a server's machine) can map to a property whose value is the identity of the referenced bean, as well as a link (which can be omitted if the reference is null), for example:

```
{
    machine: [ "domain", "machines", "Machine-0" ],
    links: [
        { rel: "machine", href:
"http://localhost:7001/management/latest/weblogic/edit/machines/Machine-0" }
    ]
}
```

In accordance with an embodiment, collections of references (e.g. a server's candidate machines) can map to an array property where each element is an object containing the referenced bean's identity as well as a link to the bean, for example:

```
{
    candidateMachines: [
        {
            identity: [ "machines", "Machine-0" ],
            links [ { rel: "canonical", href:
"http://localhost:7001/management/weblogic/latest/edit/machines/Machine-0"
        },
        {
            identity: [ "machines", "Machine-1" ],
            links [ { rel: "canonical", href:
"http://localhost:7001/management/weblogic/latest/edit/machines/Machine-1"
        }
    ]
}
```

In accordance with an embodiment, a null reference or null reference collection can be mapped to a JSON null.

In accordance with an embodiment, java.util.Properties hold lists of properties, e.g. a CommonLogMBean's LoggerSeverityProperties property. It is mapped to a JSON object, with a matching string property for each property in the set of properties, for example:

```
{
    "property1": "value1",
    "property2": "value2"
}
```

Null java.util.Properties are mapped to a JSON null. Note that the JSON mapping for field names lets them be quoted, which can be used to address odd property names.

In accordance with an embodiment, some application server bean string properties are encrypted because they hold sensitive data like passwords. Special rules can be applied to such properties.

While clients must be able to set passwords (this is done by passing them in as strings), customers are not allowed to view them, but would like to know whether the password has a value (vs. null).

In accordance with an embodiment, the mapping can differ for inbound and outbound encrypted properties. For outbound encrypted properties, if a password is null, then it can be mapped to JSON null. If not, then it's mapped to the JSON string "@Oracle_Confidential_Property_Set_V1.1#". This lets the customer know whether the property has a value, but does not let the customer know what the value is.

In accordance with an embodiment, for inbound encrypted properties, a customer will do a GET to fetch the current value of a resource, then set the values for the properties that should be changed, leaving others properties with their current values, then POST the new value back. If the POSTed value is "@Oracle_Confidential_Property_Set_V1.1#", then the property is not set (i.e. this value says 'retain the old property value'). Otherwise the value is set.

In accordance with an embodiment, some application server beans have String properties that hold the names of referenced beans, rather than actual bean references. The generated REST mapping will not try to fix this.

In accordance with an embodiment, runtime beans have weblogic.health.HealthState properties. REST can use a mapping, e.g.:

```
{
    state: "failed",
    reasons: "..."
}
```

In accordance with an embodiment, some bean properties use other types such as pojos, Object, Map, List and byte, the mapping of which can be hand coded rather than dynamically mapped.

Viewing an Application Server Bean

In accordance with an embodiment, an application server bean can be viewed by invoking the http GET method on a corresponding REST url. For example, GET http://localhost:7001/management/latest/edit/latest/servers/Server-0 gets the configuration for the server 'Server-0'.

For WLS, GET returns a standard Oracle REST response body. It returns a JSON object containing the bean's properties and a 'links' property is a JSON array containing links to related resources. The returned JSON object contains the WLS bean's properties (i.e. normal properties and references, but not children), using the standard java to JSON mappings. It also includes an 'identity' property that specifies the bean's identity. For example:

```
{
    identity: [ "domain", "servers", "Server-0" ],
    name: 'Server-0',
    listenPort: 7001,
    machine: { identity: [ "domain", "machines", "Machine-0" ] }
}
```

The property names 'links' and 'messages' are reserved. To avoid collisions, the WLS MBeans support an @restName javadoc tag for customizing the REST name of a bean or property.

In accordance with an embodiment, resources can include 'self' and 'canonical' top level links that refer back to the resource, for example a server contains self and canonical links that refer to that server:

```
{
    links: [
        { rel: "self", href:
"http://localhost:7001/management/weblogic/latest/edit/servers/Server-0" }
        { rel: "canonical", href:
"http://localhost:7001/management/weblogic/latest/edit/servers/Server-0" }
    ]
}
```

In accordance with an embodiment, all resources, except for root resources, include a top level link to a parent resource. The link's 'rel' is set to 'parent'. Collection children return links to the collection resource, for example, a server returns a link to the servers collection resource:

```
{
    links: [
        { rel: "parent", href:
"http://localhost:7001/management/weblogic/latest/edit/servers" }
    ]
}
```

In accordance with an embodiment, singleton children return links to their parent resource, for example, an SSL bean can return a link to the server bean:

```
{
    links: [
        { rel: "parent", href:
"http://localhost:7001/management/weblogic/latest/edit/servers/Server-0" }
    ]
}
```

In accordance with an embodiment, if a bean is a creatable optional singleton, and the bean currently exists, then a link to its corresponding create-form resource is also returned. The link's 'rel' is set to 'create'. For example, GET of a security realm's adjudicator also returns:

```
{
    links: [
        {
```

```
            rel: "create",
            href:
"http://localhost:7001/management/weblogic/latest/edit/securityConfiguration/realms/my
realm/adjudicatorCreateForm"
        }
    ]
}
```

In accordance with an embodiment, an application server bean's containment properties (i.e. children) are mapped to separate REST resources and are returned as top level links in the JSON response body. Each link's 'rel' property (i.e. 'relationship') can be mapped to the bean property's name. For example, GET of Server-0 returns:

```
{
    links: [
        // mandatory singleton child:
        {
            rel: "SSL",
            href: "http://localhost:7001/management/weblogic/latest/servers/Server-
0/SSL"
        },
        // writable collection of children:
        {
            rel: "networkAccessPoints",
            href: "http://localhost:7001/management/weblogic/latest/edit/servers/Server-
0/networkAccessPoints"
        }
    ]
}
```

In accordance with an embodiment, links to create-form resources are returned for creatable containment properties (singletons and collections). The link's 'rel' can be set to '<singularPropertyName>CreateForm'. For example, GET of Server-0 also returns:

```
{
    links: [
        {
            rel: "networkAccessPointCreateForm",
            href:
"http://localhost:7001/management/weblogic/latest/edit/servers/Server-
0/networkAccessPointCreateForm"
        }
    ]
}
```

In accordance with an embodiment, application server beans can return top level links for each non-null singleton reference. The link's 'rel' can be set to the name of the reference property. For example, if Server-0 refers to Machine-0:

```
{
    machine: [ "machines", "Machine-0" ],
    links: [
        { rel: "machine", href:
"http://localhost:7001/management/weblogic/latest/edit/machines/Machine-0" }
    ]
}
```

And, if Server-0 has no machine reference:

```
{
    machine: null
}
```

In accordance with an embodiment, application server beans return nested links for each reference in a reference collection. The link's 'rel' can be set to 'self' to mirror a collection pattern. For example, if Application-0 refers to the targets "Server-0" and "Cluster-0":

```
{
    targets: [
        {
            identity: ["clusters", "Cluster-0" ],
            links: [ { rel: "self", href:
"http://localhost:7001/management/weblogic/latest/edit/clusters/Cluster-0"
} ]
        },
        {
            identity: ["servers", "Server-0" ],
            links: [ { rel: "self", href:
"http://localhost:7001/management/weblogic/latest/edit/servers/Server-0"
} ]
        }
    ]
}
```

In accordance with an embodiment, resources can also return top level links to their operation resources. The links' rel's are set to 'action' and the links' title's are set to the name of the operation. For example, a ServerRuntimeMBean returns:

```
{
    links: [
        {
            rel: "action",
            title: "suspend",
            href:
"http://localhost:7001/management/weblogic/latest/domainRuntime/serverRuntimes/Server-
0/suspend"
        },
        {
            rel: "action",
            title: "resume",
            href:
"http://localhost:7001/management/weblogic/latest/domainRuntime/serverRuntimes/Server-
0/resume"
        },
        {
            rel: "action",
            title: "shutdown",
            href:
"http://localhost:7001/management/weblogic/latest/domainRuntime/serverRuntimes/Server-
0/shutdown"
        }
    ]
}
```

Viewing a Collection of Beans

In accordance with an embodiment, a collection of application server beans can be viewed by invoking the http GET method on its corresponding REST URL. For example, GET http://localhost:7001/management/weblogic/latest/edit/servers gets the configuration of all the servers. GET returns a standard REST response body. 'items' contains the children's properties. Each item has an embedded 'self' and 'canonical' links to that child's resource. Only the immediate children are returned. For example, if you get the servers collection, each server's properties will be returned, but the server's children (such as SSL) are not returned.

The resource returns a JSON object for each child in the collection. These objects contain the same data as the items returned from calling GET on the children's resources. For example, getting the domain bean's 'servers' collection returns:

```
{
    items: [
        { name: "Server-1", listenPort: 7001, ... },
        { name: "Server-2", listenPort: 7003, ... }
    ]
}
```

The items are unordered, except for ordered collections.

In accordance with an embodiment, a collection resource returns the following links: 'self' and 'canonical' links to itself, a link to its parent, a link to its corresponding create form resource if the collection is writable, nested 'self' and 'canonical' links to each of its children. For example, getting the domain bean's 'servers' collection returns:

```
{
    items: [
        {
            name: "Server-1",
            listenPort: 7001,
            links: [
                { rel: "self", href:
"http://localhost:7001/management/weblogic/latest/edit/servers/Server-1" }
                { rel: "canonical", href:
"http://localhost:7001/management/weblogic/latest/edit/servers/Server-1" }
            ]
        },
        {
            name: "Server-2",
            listenPort: 7005,
            links: [
                { rel: "self", href:
"http://localhost:7001/management/weblogic/latest/edit/servers/Server-1" }
                { rel: "canonical", href:
"http://localhost:7001/management/weblogic/latest/edit/servers/Server-1" }
            ]
        }
    ]
    links: [
        { rel: "self", href:
"http://localhost:7001/management/weblogic/latest/edit/servers" }
        { rel: "canonical", href:
"http://localhost:7001/management/weblogic/latest/edit/servers" }
        { rel: "parent", href:
"http://localhost:7001/management/weblogic/latest/edit" }
        { rel: "create-form", href:
"http://localhost:7001/management/weblogic/latest/edit/serverCreateForm"
    ]
}
```

Retrieving a Create Form

In accordance with an embodiment, a create form for creating a new resource is retrieved by invoking the http GET method on its corresponding create form REST url. For example, GET http://localhost:7001/management/weblogic/latest/edit/serverCreateForm to retrieve a create form for creating a new server. GET returns a standard WLS REST response body. It returns a JSON object containing the create form's properties and a 'links' property is a JSON array containing links to related resources.

In accordance with an embodiment, the returned JSON object contains a property for each writable property (normal properties and references) that may be specified when creating a new resource of that type. The property's value will either be the default value from the type's bean info (if available), or the default value for property's type (e.g. 0 for an int). The values for reference properties are always null. Create forms do not attempt to generate unused names (e.g. Server-0). For example, getting the domain's 'serverCreate-Form' returns:

```
{
    name: null, // identity - unique names are not generated
    idleConnectionTimeout: 65, // from the default value in the bean info
    replicationGroup: null, // default value for a String since the bean info
does not provide a default value
    machine: null, // singleton reference
    candidateMachines: null, // reference collection
    ...
}
```

In accordance with an embodiment, a create form returns the following links: 'self' and 'canonical' links to itself, a link to its parent, a 'create' link to the corresponding resource that can be used to create a resource of this type. For example, getting the domain bean's 'serverCreateForm' returns:

```
{
    links: [
        { rel: "parent", href:
            http://localhost:7001/management/weblogic/latest/edit },
        { rel: "self", href:
"http://localhost:7001/management/weblogic/latest/edit/serverCreateForm"
        }, { rel: "canonical", href:
"http://localhost:7001/management/weblogic/latest/edit/serverCreateForm"
        }, { rel: "create", href:
"http://localhost:7001/management/weblogic/latest/edit/servers" }
    ]
}
```

GET Content Filtering

In accordance with an embodiment, bean, collection and create form resource GET methods support query parameters to let the caller omit properties and links from the response. The query parameters are shown below in table 4.

TABLE 4

| Parameter | Response |
| --- | --- |
| fields | only return these properties |
| excludeFields | return all properties except for these properties |
| links | only return links with these 'rel' names |
| excludeLinks | return all links except for the ones with these 'rel names |

Parameters 'fields' and 'excludeFields' are mutually exclusive, as are 'links' and 'excludeLinks'. All values are comma separated lists of names. For example, to only retrieve a server's self and parent links, and name and listenPort properties, use:

```
curl ... -X GET
http://localhost:7001/management/weblogic/latest/edit/servers/myserver\
?fields=name,listenPort\&links=self,parent
{
    links: [
        { rel: "parent", href:
"http://localhost:7001/management/weblogic/latest/edit/servers" },
        { rel: "self", href:
```

```
"http://localhost:7001/management/weblogic/latest/edit/servers/myserver"
    }
    ],
    name: "myserver",
    listenPort: 7001
}
```

Modifying Application Server Configuration

In accordance with an embodiment, beans can be can created, modified and deleted in the edit tree ( . . . /management/weblogic/<version>/edit/ . . . ). The other bean trees are read-only.

In accordance with an embodiment, application server bean edits must be done inside a configuration transaction.

In accordance with an embodiment, if a user has already started a transaction, REST changes will be made to the same transaction. The user is still responsible for committing or rolling back the transaction. If no user has started a transaction, the REST resource will begin a transaction on that user's behalf, try to make the changes, and either commit or roll back the transaction depending on whether the changes could be made (i.e. auto-transactions). If another user already has started a transaction, the REST resource will return an error (instead of modifying the configuration).

Sometimes a configuration transaction cannot be committed unless complementary changes to multiple beans are made in the same transaction. In these rare cases, the client will need to begin and end the transaction, rather than relying on auto-transactions.

Ideally, REST resources would never change configuration when they return an error. However, this is very difficult to implement because the underlying application server beans do not support nested transactions and while most of the application server beans throw uniform exceptions for user-input related errors, not all do, so it is hard for a generated REST resource to tell the difference between a user error and an internal server error. In accordance with an embodiment, REST resources make a reasonable/best effort to be atomic, but it is not a 100% guarantee. The sections below describe how each editing method attempts to ensure atomicity.

Modifying Application Server Configuration Bean

In accordance with an embodiment, to modify an application server bean, a JSON object can be constructed containing the values to change then the http POST method can be invoked on a corresponding REST URL, passing in that JSON object as the request body. For example, to change a server's listen port and administration port:

```
curl ... -d "{
    listenPort: 7007,
    administrationPort: 9007
}" -X POST
http://localhost:7001/management/weblogic/latest/edit/servers/Server-0
```

Modification of the application server bean is similar to an http PATCH operation where only part of the bean is modified, rather than sending in all of the bean's properties each time.

In accordance with an embodiment, a JSON object can be constructed containing the values to be changed. Some application server bean properties are read-only (for example, a server's name). Read-only properties can be ignored. Not all of the bean properties need be passed in. Any properties not passed in will retain their current values.

As describe above, GET returns the value "@Oracle_Confidential_Property_Set_V1.1#" for an encrypted string property that has a non-null value. If this value is POST back, then the property will retain its current value (so that you can safely GET the resource, change some of its properties, then POST it back to write out the new values). If the property's value is to be changed, then the value can be set to the cleartext string that is to be set, for example: {defaultIIOPPassword: "admin123"}

In accordance with an embodiment, to change a reference, pass in its identity. Likewise, to change a reference collection, pass in an array of the new references' identities. It is noted that this replaces the reference collection rather than adding references to the collection. For example, to set a server's machine to 'Machine-0' and candidateMachines to 'Machine-0' and 'Machine-1', use:

```
{
    machine: [ 'machines', 'Machine-0' ] },
    candidateMachines: [
        { identity: [ 'machines', 'Machine-0' ] },
        { identity: [ 'machines', 'Machine-1' ] }
    ]
}
```

In accordance with an embodiment, null is used to remove reference(s). For example, to remove a server's machine and candidate machines references, use:

```
{
    machine: null,
    candidateMachines: null
}
```

The REST resource loops over each property the client passed in. If the property is read-only or not supported by the WLS bean, then the resource skips it. Otherwise the resource attempts to set the property. If an error occurs setting the property, then the resource adds a failure message to the response stating that that property could not be set and why, then continues on to the next property. Therefore, if the user passes in a mix of valid and invalid values, the valid ones are written out and errors are returned for the invalid ones, and overall, the REST method returns an 'OK' status code. For example:

```
curl ... -d "{
    listenPort: 7007,
    administrationPort: 'foo'
}" -X POST
http://localhost:7001/management/weblogic/latest/edit/servers/Server-0
HTTP/1.1 200 OK
{
    messages: [
        {
            severity: "FAILURE",
            field: "administrationPort",
            message: "Something about the value needs to be an integer"
        }
    ]
}
```

In this example, the listen port is modified and the administration port is not. The method returns an 'OK' status code.

Creating a New Application Server Configuration Bean

In accordance with an embodiment, a client can create a new application server configuration bean by POSTing a JSON structure containing the new bean's properties. To make this easier, the client can use corresponding create form resource to retrieve a template JSON structure that is populated with default values for the various writable properties.

In an embodiment, a collection child can be created by calling POST on the collection's URI, e.g. http://localhost:7001/management/weblogic/latest/edit/servers.

In an embodiment, an optional singleton child can be created by calling POST in the proposed child's URI, e.g., http://localhost:7001/management/weblogic/latest/edit/securityConfiguration/realms/myRealm/adjudicator.

In an embodiment, a create form can be retrieved by calling GET on the corresponding create form resource, e.g. http://localhost:7001/management/weblogic/latest/edit/serverCreateForm and http://localhost:7001/management/weblogic/latest/edit/securityConfiguration/realms/myRealm/adjudicatorCreateForm.

In an embodiment, the underlying application server beans have javadoc tags that specify default values for many properties. Clients typically want to display these default values to customers who customize them then use them to create a new application server bean. A client can get these default values by calling GET on the corresponding create form resource. For example:

```
curl ... -X OPTIONS
http://localhost:7001/management/weblogic/latest/edit/serverCreateForm
HTTP/1.1 200 OK
{
    listenPort: 7001,
    ...
}
```

An application server configuration bean can be created by POSTing a JSON object containing the new bean's properties. The JSON object does not need to include all possible properties. Unspecified properties are set to their default values. All collection children need to be assigned a unique identity within their collection, for example, a server needs a name. Therefore, the identity property is not optional. The response contains a location header containing the resource's URL. For example:

```
curl ... -d "{
    name: "Server-1",
    defaultProtocol: "t3s"
}" -X POST http://localhost:7001/management/weblogic/latest/edit/servers
HTTP/1.1 201 Created
Location:
http://localhost:7001/management/weblogic/latest/edit/servers/Server-1
curl -X GET
http://localhost:7001/management/weblogic/latest/edit/servers/id/Server-1
HTTP/1.1 200 OK
{
    item: {
        identity: [ "domain", "servers", "Server-1" ],
        name: "Server-1",
        defaultProtocol: "t3s", // specified by the caller
        listenAddress: 7001 // not specified by the caller, therefore set to its default value
    }
}
```

If a bean with that name already exists, then the resource returns a BAD_REQUEST status code along with a failure message. For example:

```
curl ... -d "{
    name: "Server-1"
}" -X POST http://localhost:7001/management/weblogic/latest/edit/servers
HTTP/1.1 400 Bad Request
```

```
{
    type: "http://oracle/TBD/WlsRestMessageSchema",
    title: "FAILURE",
    detail: "Bean already exists:
\"weblogic.management.configuration.ServerMBeanImpl@31fa1656([mydomain]/Servers[Server
-1])\"",
    status: 400
}
```

Similar to updating an application configuration bean, the caller can pass in a mix of valid and invalid values for the resource to handle. The underlying application beans have separate methods for creating new beans and setting their properties.

In accordance with an embodiment, the REST layer first creates the bean, then loops over each property to set its value. Read-only properties and properties that the bean does not support are ignored. If there is an exception setting a property, the resource adds a failure message to the response and continues on to the next property. After processing all of the properties, if there were any errors, then the resource attempts to delete the new bean and returns a 'Bad Request' status code.

A first example includes a mixture of valid and invalid properties:

```
curl ... -d "{
   name: "Server-1",
   listenPort: abc,
   defaultProtocol: "no-such-protocol",
   adminstrationProtocol: "iiop"
}" -X POST http://localhost:7001/management/weblogic/latest/edit/servers
HTTP/1.1 400 Bad Request
{
   type: "http://oracle/TBD/WlsRestMessagesSchema",
   title: "ERRORS",
   status: 400,
   wls:errorsDetails:[
      {
         type: "http://oracle/TBD/WlsRestMessageSchema",
         title: "FAILURE",
         detail: "no-such-protocol is not a legal value for DefaultProtocol.\
         The value must be one of the following: [t3, t3s, http, https, iiop,
iiops]",
         o:errorPat: "defaultProtocol"
      },
      {
         type: "http://oracle/TBD/WlsRestMessageSchema",
         title: "FAILURE",
         detail: "Type mismatch. Cannot convert abc to int",
         o:errorPath: "listenPort"
      }
   ]
}
```

A second example includes all valid properties:

```
curl ... -d "{
   name: "Server-1",
   listenPort: 7003,
   defaultProtocol: "https",
   adminstrationProtocol: "iiop"
}" -X POST http://localhost:7001/management/weblogic/latest/edit/servers
HTTP/1.1 201 Created
Location:
http://localhost:7001/management/weblogic/latest/edit/servers/Server-1
```

Deleting an Application Server Configuration Bean

In accordance with an embodiment, an application server bean (both collection children and optional singleton children) can be deleted by invoking the http DELETE operation on its corresponding REST URL. Any references to that bean will be automatically removed too. For example, to delete a server:

```
curl ... -X DELETE
http://localhost:7001/management/weblogic/latest/edit/servers/Server-0
```

Expanded Values

In accordance with an embodiment, at the underlying mbean level, an mbean property can either be set or unset. If it is set, then its value is persisted (e.g. to config.xml) and locked in. If it is unset, then a default value is used. The value can either be the default value for the property's type, a hard coded default value, or a computed default value that runs some custom Java code. The mbean author specifies the default value by using various javadoc tags. Mbean APIs ask whether a property has been set, and unset a property so that it goes back to its default value.

In accordance with an embodiment, the REST layer hides whether a property is set or unset by default. When users GET a resource, the property's current value is returned. When users set the value of a String property to null or an empty string, it unsets the property (i.e. returns it to its default value).

Since the REST layer wants to make all mbean functionality available, it provides a mechanism to let the user see whether a property has been set, and a mechanism to explicitly set or unset a property.

In accordance with an embodiment, if the caller sets an "expandedValues" query parameter to true when getting a resource, each value is returned as a JSON object with a 'set' boolean property and a 'value' property that holds the current value. For example, getting a server returns:

```
curl ... -X GET \
http://localhost:7001/management/weblogic/latest/edit/servers/myserver?&expandedValues
=true
{
   listenPortEnabled: { set: false, value: true }, // currently not set
   name: { set: true, value: "myserver" }, // currently set
   listenPort: { set: true, value: 7003 } // currently set
}
```

In accordance with an embodiment, the caller can use the expandedValues query parameter to explicitly set or unset values. For example, to unset the listen port and set the listen address to an empty string:

```
curl ... -d "{
    listenPort: { set: false }, // value will be ignored if specified
    listenAddress: { set: true, value: "" }
}" -X POST
http://localhost:7001/management/weblogic/latest/edit/servers/myserver?expandedValues=true
```

Heterogeneous Collections

In accordance with an embodiment, most application server bean collections are homogeneous, e.g. a domain's machines. However, there are heterogeneous collections. For these collections, the parent bean typically has a homogeneous contained collection for each specific type, and a collection of references for the base type.

An example includes JMS destinations. Queues and topics are kinds of destinations. The domain has contained collection of JMSQueues (create/list/destroy queues), contained collection of JMSTopics (create/list/destroy topics), and reference collection of JMSDestinations (list all queues & topics). In accordance with an embodiment, REST mapping for this creates:

. . . /domain/JMSQueues (create/list just the queues)
. . . /domain/JMSTopics (create/list just the topics)
. . . /domain/JMSQueues/<queueName>(view/update/delete a queue)
. . . /domain/JMSTopics/<topicName>(view/update/delete a topic)
. . . /domain has a 'JMSDestinations' property that returns a collection of references to all the queues and topics In accordance with an embodiment, hand-coded mapping of REST resources may use a different pattern for heterogenous resources, e.g.:

. . . /jms/destinations/queue (writable collection of contained children—create/view queues, returns all queue properties)
. . . /jms/destinations/topic (writable collection of contained children—create/view topics, returns all topic properties)
. . . /jms/destinations (read-only collection of contained children—GET returns all the queues and topics, trimmed down to just the properties that are shared by all destinations)
. . . /jms/destinations/queue/<queueName>—view/update/delete a queue
. . . /jms/destinations/topic/<topicName>—view/update/delete a topic Invoking Operations Each application server bean operation maps to its own REST URI. In the case of overloaded operations (e.g. shutdown( ) vs shutdown(int, boolean), all overloaded operations map to the same URI and the resource looks at the incoming arguments to determine which operation to invoke.

If the operation requires input arguments, then they are specified by passing in a JSON object request body with a property for each argument. The name of the property matches the name of the argument (this requires that all mbean operation arguments have an @param javadoc tag).

If the operation does not take input arguments, then the client must pass in a JSON object with no properties. Similarly, if the operation returns a value, then it is passed back in a standard REST response body's JSON object 'return' property. If the operation is void, then the response body does not include an 'return' property.

If the underlying mbean operation throws an exception, then the REST method sends back a normal bad request (404) response containing the exception's text.

A first example includes a void operation with no arguments: void shutdown( ) as follows:

```
curl ... -d { } \
-X POST
http://localhost:7001/management/weblogic/latest/domainRuntime/serverRuntimes/Server-0/shutdown
{
    // response does not include a 'return' property since it's a void operation
}
```

A second example includes a void operation with multiple arguments: void shutdown(int timeout, boolean ignoreSessions) as follows:

```
curl ... -d { timeout: 500, ignoreSessions: false } \
-X POST
http://localhost:7001/management/weblogic/latest/domainRuntime/serverRuntimes/Server-0/shutdown
{
    // response does not include a 'return' property since it's a void operation
}
```

A third example includes a non-void operation with an argument: String getURL(String protocol) as follows:

```
curl ... -d { protocol: "http" } \
-X POST
http://localhost:7001/management/weblogic/latest/domainRuntime/serverRuntimes/Server-0
/getURL
{
    return: "http://localhost:7003"
}
```

If there are multiple methods with the same name but different signatures, then the method whose signature matches the parameters specified will be called. Since multiple Java types can map to the same JSON type (e.g. Java int and long both map to a JSON number), it can be ambiguous which method to call. None of the WLS mbeans currently have ambiguous signatures. In accordance with an embodiment, an automated test can detect ambiguous signatures (in case there is an attempt to add one to the application mbeans).

Standard REST Response

In accordance with an embodiment, a REST method returns 200 (OK) if the operation succeeds and does not create a new entity, for example, GET a resource, POST to invoke an operation or modify an entity, DELETE to remove an entity.

In accordance with an embodiment, a REST method returns 201 (CREATED) if the operation successfully created a new entity. It also returns a 'Location' header with a link to the new entity.

In accordance with an embodiment, a REST method returns 202 (ACCEPTED) if the operation successfully spawned some asynchronous work. It also returns a 'Location' header with a link to a resource that the caller can poll to find out the status of the spawned job.

In accordance with an embodiment, a REST method returns 400 (BAD REQUEST) if the request failed because something wrong in the specified request, for example invalid argument values. It is noted that when an underlying mbean method throws an exception, the REST layer can't tell whether it's caused by a user input error, or whether it's caused by an internal problem in WLS, so it needs to make a guess. In these cases, it returns BAD REQUEST.

In accordance with an embodiment, a REST method returns a 401 (UNAUTHORIZED) if the user does not have permission to perform the operation. 401 is also returned (by the web container) if the user supplied incorrect credentials (e.g. a bad password).

In accordance with an embodiment, a REST method returns 403 (FORBIDDEN) if the user is not in the required ADMIN, OPERATOR, DEPLOYER or MONITOR role. This is enforced by the web container.

In accordance with an embodiment, a REST method returns 404 (NOT FOUND) if the requested URL does not refer to an existing entity.

In accordance with an embodiment, a REST method returns 405 (METHOD NOT ALLOWED) if the resource exists but does not support the HTTP method, for example, if the user tries to create a server by using a resource in the domain config tree (only the edit tree allows configuration editing).

In accordance with an embodiment, a REST method returns 500 (INTERNAL SERVER ERROR) if an error occurred that is not caused by something wrong in the request. Since the REST layer generally treats exceptions thrown by the mbeans as BAD REQUEST, 500 is generally used for reporting unexpected exceptions that occur in the REST layer. These responses do not include the text of the error or a stack trace, however, generally they are logged in the server log.

In accordance with an embodiment, if a resource returns one error string, it uses this format (note that the URL provided for type is merely exemplary):

```
HTTP/1.1 400 Bad Request
{
    type: "http://oracle/TBD/WlsRestMessageSchema",
    title: "FAILURE",
    detail: "Bean already exists:
\"weblogic.management.configuration.ServerMBeanImpl@31fal656([mydomain]/Servers[Server
-1])\"",
    status: 400
}
```

In accordance with an embodiment, if a resource returns more than one error string, it uses the following forma (note that the URL provided for type is merely exemplary):

```
HTTP/1.1 400 Bad Request
{
  type: "http://oracle/TBD/WlsRestMessagesSchema",
  title: "ERRORS",
  status: 400,
  wls:errorsDetails: [
    {
        type: "http://oracle/TBD/WlsRestMessageSchema",
        title: "FAILURE",
        detail: "no-such-protocol is not a legal value for DefaultProtocol.\
        The value must be one of the following: [t3, t3s, http, https, iiop,
iiops]",
        o:errorPat: "defaultProtocol"
    },
    {
        type: "http://oracle/TBD/WlsRestMessageSchema",
        title: "FAILURE",
        detail: "Type mismatch. Cannot convert abc to int",
        o:errorPath: "listenPort"
    }
  ]
}
```

REST on Managed Servers

In accordance with an embodiment, each managed server hosts an internal management services web application that exposes that managed server's server runtime tree (the domain configuration it is running against as well as its runtime beans). Similarly, the admin server hosts an internal management services web application that exposes the edit tree (for managing the domain configuration), the admin server's server runtime as well as the domain runtime tree (which provides for monitoring all of the running managed servers), and all of the REST resources.

In accordance with an embodiment, clients can directly invoke REST resources on managed servers for situations where they do not want to depend on the availability of the admin server for ongoing monitoring and operations. In WLS, for examples, this operational mode is commonly assumed by Enterprise Manager and is supported in WLS JMX interfaces.

In accordance with an embodiment, accessing REST on a managed server can operate substantially the same as accessing REST on the admin server except that the URL is different and the managed servers only support the server runtime and config REST resources.

In accordance with an embodiment, if the client uses the admin server's domain runtime resources to monitor one or more managed servers, the admin server traps out the REST calls and forwards them to the managed servers, collects the responses and then returns them to the client. It uses the work manager so that the per-managed server REST calls are done in parallel (to improve performance). The client authenticates to the admin server as part of making a REST call. An identity propagation API used by the REST code in the admin server can propagate the client's identity to the managed server.

Partition Security

In accordance with an embodiment, an application server using REST can enable a user having a role restricted to a partition to manage mbeans for that partition, while preventing the user from managing mbeans for other partitions.

Figure 8:
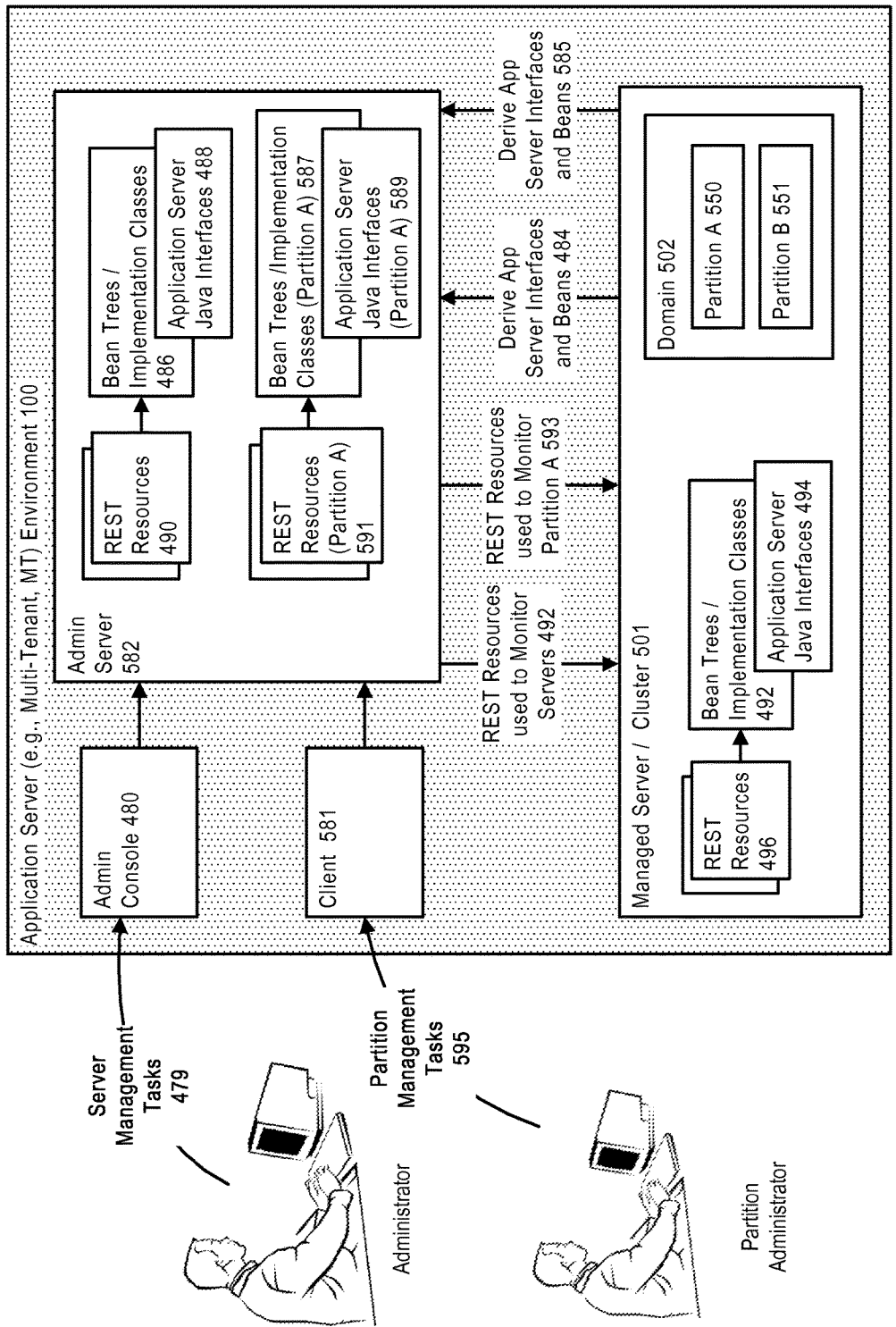
FIG. 8 illustrates a system for supporting RESTful management in an environment for operating application software, in accordance with an embodiment.

FIG. 8 illustrates the use of RESTful management in an application server, cloud or other environment, in accordance with an embodiment. As shown, an application server (e.g., multi-tenant, MT) environment 100, or other computing environment which enables the deployment and executing of software programs, can be configured so as to be manageable using a REST API. REST resources are dynamically generated upon the initiation of an edit session, for example, or upon the initiation of a session to perform some other administrative task.

As shown in FIG. 8, the application server environment includes a managed server and/or server cluster 501 comprising a domain 502 within which is created partition A 550 and partition B 551. The partitions can have configurations and include artifacts created within the partitions, as described above.

In accordance with an embodiment, security policies can be used to determine which mbeans are accessible to a user via a REST API. The security policies can include partition scoping rules.

In accordance with an embodiment, a user assigned to a role of administrator can access the application server environment via a client, e.g. an administration (admin) console 480, which calls the REST API to interact with an admin server 582 for administering the application server environment. In response, REST resources 490 on the admin server can include dynamically generated bean trees/implementation classes 486 and application server Java interfaces 488 derived from application server interfaces and beans 484 for use by administrator to perform management tasks 479 using REST-based protocol.

As shown in FIG. 8, a user assigned to a partition administrator role can be permitted access to partition A, but not permitted access to partition B. The partition administrator can use a client 581, which calls the REST API, to interact with the admin server to manage features of partition A. In response, REST resources 591 on the admin server can include dynamically generated bean trees/implementation classes 587 and application server java interfaces 589 derived from application server interfaces and beans 585 for use by the partition administrator to perform management tasks 595 on partition A using REST-based protocol, including monitoring partition A 593. However, the REST resources will be limited based on the partition administrator role, and, for example, will not include REST resources for use outside of partition A.

In accordance with an embodiment, REST resources generated for use by a role allowed access to a partition can be further limited to certain management functions within the partition itself.

In accordance with an embodiment, an administrator can configure which users belong to which partitions.

In accordance with an embodiment, when a client makes a request, the URL in the request can contain information indicating which mbeans need to be accessed (e.g. . . . /management/WebLogic/latest/edit/partitions/coke).

In accordance with an embodiment, security providers associated with the partitionable environment authenticate the user and include information about partitions associated with the user in the subject.

In accordance with an embodiment, a web container can make an authorization check to determine whether the user is allowed to access a REST URL. Security providers grant access to a user where a web application is configured to allow the user access.

In accordance with an embodiment, REST code can be called via Java API for RESTful Services (JAX-RS).

In accordance with an embodiment, the REST code can examine the URL pattern and determine which mbean is to be accessed (e.g. the 'coke' partition).

In accordance with an embodiment, The REST code can call the security authorization code to determine if the current subject (i.e. the client) is allowed to access an mbean.

In accordance with an embodiment, the security providers can determine if the user is allowed to access the mbean, for example using the configured mbean security policies, most of which come from javadoc annotations on the security mbeans.

In accordance with an embodiment, the REST code can use the corresponding bean in the bean tree if the user is allowed access. If the user is fetching multiple mbeans (e.g. the partitions collection, or is doing a bulk query), and is denied access to some of the mbeans, then those mbeans to which the user is denied access can be silently omitted from a response. Likewise, mbean properties that the user is denied access to can be omitted from the response. If the user lists the partitions, the user will only see that user's partitions, rather than receiving an authorization failure for an mbean to which the user is denied access. If the user is operating on one mbean and is denied access to the one bean, then the REST code can return a 401 (UNAUTHORIZED) response.

Bulk Access

Console pages are typically used to either to monitor or to configure. Monitoring pages typically read trees of runtime beans from all the managed servers in an environment, then collate the data. Historically, monitoring pages have been a performance bottleneck for application servers since they must make one remote procedure call (RPC) for each accessed runtime bean on each managed server. RPCs can be slow.

In accordance with an embodiment, a REST API can include a bulk access capability that let clients dynamically describe a tree of beans that should be returned in one call.

Each tree (e.g. edit, domain runtime), includes a root 'search' resource. A user POSTs a query to one of these 'search' resources. The query indicates which beans (and properties and links) that should be returned, that is, a 'slice' of the bean tree. This result replaces all of the per-bean RPCs with one overall RPC.

Exemplary Implementation of Bulk Access

As mentioned above, in accordance with an embodiment, a REST API can include a bulk access capability that allows clients to dynamically describe a tree of beans that should be returned in one call, rather than a series of RPCs. In an embodiment, the bulk access capability can be implemented as follows.

Search Resources

In accordance with an embodiment, each bean tree can include a search resource for bulk queries. The search resources for an admin server are shown below in Table 5, while the search resources for managed servers are shown below in Table 6.

TABLE 5

| Search Resource | Result |
| --- | --- |
| .../management/edit/search | Returns a slice of the edit bean |
| .../management/domainConfig/search | Returns a slice of the last config bean tree that was saved to disk |
| .../management/serverConfig/search | Returns a slice for the admin server's config bean tree |
| .../management/domainRuntime/search | Returns a slice of the admin server's domain runtime bean tree |
| .../management/serverRuntime/search | Returns a slice of the admin server's runtime bean tree |

TABLE 6

| Search Resource | Result |
| --- | --- |
| .../management/serverConfig/search | Returns a slice of the managed server's config bean tree |
| .../management/serverRuntime/search | Returns a slice of the managed server's runtime bean tree |

Object Query

In accordance with an embodiment, a client POSTs a query to a search resource. The query starts searching at the root bean of the tree. The resource returns a normal JSON response containing the results of the query, i.e. the slice of the bean tree.

In accordance with an embodiment, an 'object query' describes what data should be returned for an application server bean (or collection of beans), including which of the bean's properties should be returned, which of the bean's links should be returned, which of the bean's children should be returned, and for a collection, which of its children should be returned. It is noted that all searches start at the root bean of the search resource's tree. For example, POSTing to management/domain/runtime starts searching at the DomainRuntimeMBean in the domain runtime tree.

In accordance with an embodiment, 'fields' specifies which bean properties (e.g. scalars and references) are returned, and can comprise is a JSON string array of property names. For example, to return the domain's name and configurationVersion, use:

```
curl ... -d "{ fields: [ 'name', 'configurationVersion' ] }" \
-X POST http://localhost:7001/management/weblogic/latest/edit/search
```

In accordance with an embodiment, if a query lists properties that the bean does not support then that part of the query is ignored. If 'fields' is not specified, then all of the properties are returned.

In accordance with an embodiment, 'excludeFields' specifies a list of fields that should not be returned. All other properties are returned. As such, 'fields' and 'excludeFields' are mutually exclusive. It is noted that a query's 'fields' and 'excludeFields' mirror the 'fields' and 'excludeFields' query parameters that can be specified when calling GET on a resource. The difference is that the query parameters use comma separated names and queries use JSON arrays of names.

In accordance with an embodiment, 'links' specifies which of the bean's links should be returned. It is a JSON string array of link rel names. For example, to return the domain's self and servers links:

```
curl ... -d "{ links: [ 'self', 'servers' ] }" \
-X POST http://localhost:7001/management/weblogic/latest/edit/search
```

In accordance with an embodiment, if the query lists links that the bean does not support then that part of the query is ignored. If 'links' is not specified, then all links are returned (except for collection children, which only return their 'self' and 'canonical' links by default).

In accordance with an embodiment, 'excludeLinks' specifies a list of links that should not be returned. All other links are returned. As such, 'links' and 'excludeLinks' are mutually exclusive.

In accordance with an embodiment, to return all of a collection children's links, use excludeLinks: [ ]. It is noted that a query's 'links' and 'excludeLinks' mirror the 'links' and 'excludeLinks' query parameters that can be specified when calling GET on a resource.

In accordance with an embodiment, 'children' specifies which child bean properties are returned. It is a JSON object whose property names are the names of the children to return, and whose values are object queries. For example, to fetch the domain's name, along with the name and listen port of each server, use:

```
curl ... -d "{
    fields: [ 'name' ], // only return the domain's name
    children: {
        servers: { // fetch the domain's 'servers' collection
            names: [ 'Server-0', 'Server-1' ], // only return the children whose 'name' is 'Server-0' or 'Server-1'
            fields: [ 'name', 'listenPort' ] // only return each server's name and listen port
        }
    }
}" -X POST http://localhost:7001/management/weblogic/latest/edit/search
```

In accordance with an embodiment, if 'children' is not specified, then none of the bean's children are returned.

In accordance with an embodiment, sometimes the caller wants to only return certain items in a collection (e.g. 'myserver' and 'Server-0'). Each collection child has a property that specifies its identity. Typically this is the 'name' property. The query uses this property name to specify which children of a collection are returned. It's a JSON string array of identities. 'fields' and 'links' can also be used to control which properties and links are returned for each of these children. For example, to return the name and listen port for the servers 'Server-0' and 'Server-1', use:

```
curl ... -d "{
  fields: [ 'name' ], // only return the domain's name
  children: {
    servers: { // fetch the domain's 'servers' collection
      names: [ 'Server-0', 'Server-1' ], // only return the children whose
'name' is 'Server-0' or 'Server-1'
      fields: [ 'name', 'listenPort' ] // only return each server's name and
listen port
    }
  }
}" -X POST http://localhost:7001/management/weblogic/latest/edit/search
```

In accordance with an embodiment, identities that do not exist are ignored. Similarly, if the context is not a collection, then this part of the query is ignored. All collection children are returned by default.

In accordance with an embodiment, the query language can be extended to support aggregating properties (by min/max/average) and select objects based on property values (e.g. only return the server runtimes of servers that are not in a healthy state).

In accordance with an embodiment, a response body can comprise inline properties or 'items', depending on whether the URL is for a bean or a collection. The child beans are returned as nested properties. For example:

```
curl ... -d "{
  fields: [ ], // don't return any domain level properties
  links: [ ], // don't return any domain level links
  children: {
    servers: { // fetch the domain's 'servers' collection
      names: [ 'Server-0', 'Server-1' ], // only return the children whose
'name' is 'Server-0' or 'Server-1'
      fields: [ 'name' ], // only return each server's name
      links: [ ], // don't return any per-server links
      children: {
        SSL: {
          fields: [ 'listenPort' ], // only return each server's SSL listen port
          links: [ ] // don't return any SSL level links
        }
      }
    }
  }
}" -X POST http://localhost:7001/management/weblogic/latest/edit/search
{code:JavaScript}
HTTP/1.1 200 OK
{
  servers: {
    items: [
      {
        name: "myserver",
        SSL: { listenPort: 7002}
      },
      {
        name: "AnotherServer",
        SSL: { listenPort: 7002}
      }
    ]
  }
}
```

In accordance with an embodiment, an example of bulk access whereby REST is used to get the component runtimes of specific applications on all running servers and only return the name for the server runtimes and application runtime parents, and return all of the component runtimes' properties is as follows:

```
curl ... -d "{
  fields: [ ], links: [ ], // don't return any domain runtime level properties
or links
  children: {
    serverRuntimes: {
      fields: [ 'name' ], links: [ ], // return each server's name, don't
return any server level links
      children: {
        applicationRuntimes: {
          name: [ 'myapp', 'BasicApp' ], // only return apps 'myapp'
and 'BasicApp'
          fields: [ 'name' ], links: [ ], // return each app's name but
no per-app links
          children: {
            componentRuntimes: { links: [ ] } // return all component
runtime properties, but no links
          }
        }
      }
    }
  }
}" -X POST
http://localhost:7001/management/weblogic/latest/domainRuntime/search
```

Extension Mechanism

While most WLS beans use one of the three patterns (homogeneous collection of children, mandatory singleton child, and optional homogenous singleton child) described above, some beans use different patterns. The patterns are diverse enough that it can be difficult to provide generic REST code that can handle all patterns just by inspecting the WLS bean infos. It can therefore be useful to weave bean-type-specific custom REST code into the generated REST resources.

In accordance with an embodiment, an internal extension mechanism is provided for weaving hand-coded REST resources and customization into the trees of dynamic resources.

In accordance with an embodiment, it can be preferable to extend WLS beans rather than to extend REST since whatever is added to the beans will automatically be available, for example via JMX, WLST and REST, while REST extensions are not necessarily available, for example via JMX or WLST. Consideration, therefore, should be given as to whether a features should be added to the WLS beans.

In accordance with an embodiment, resource extensions can be structured like WLS console extensions. A REST extension is a war fragment that is copied to either the domain directory or the kit. When a REST webapp starts, it locates the REST extensions and loads them (e.g. by using the java.util.ServiceLoader api).

In accordance with an embodiment, an extension can be written by writing some resource classes (standalone resources and resource extensions), writing a resource initializer class that registers the resource classes, writing a 'weblogic.management.rest.lib.utils.ResourceInitializer' file that returns the name of the resource initializer class, optionally writing web.xml and weblogic.xml fragments to customize the security roles allowed to access the extension's URLs, and packaging the classes, properties file and xml files in a war file (i.e. a 'war fragment').

In accordance with an embodiment, the extension war file can be deployed by copying it either to the domain's 'management-services-ext' directory or the kit's 'management-services-ext' directory. Like custom security providers and console extensions, the REST extensions should be copied to the managed servers' machines as well (unless the extension is only supposed to run in the admin server, e.g. the lifecycle REST resources).

At runtime, the management services REST webapp starts initializing. As it starts up, it finds and loads the extension war files (using the WLS virtual war mechanism). The ServiceLoader api is used to locate the extensions' resource initializers. The ServiceLoader does this by locating all of the 'weblogic.management.rest.lib.utils.ResourceInitializer' files in its classloader (which now includes the extensions), extracting the names of extensions' resource initializer classes from these files and constructing an instance of each. The REST webapp tells each extensions' resource initializer to initialize. Each resource initializer registers its resource classes with either JAXRS (for standalone resources) or the WLS REST infra (for extension resources). The net result of this process is that the extensions are loaded and ready to use.

In accordance with an embodiment, the kinds of extensions that are supported include adding a new child URL to an existing URL (e.g. add a 'databaseVendors' sub-resource to the 'domain' resource), adding new stand-alone resources that are not part of the existing resource trees (e.g. a documentation generation tool, lifecycle REST resources), and replacing a resource implementation (e.g. replace the 'appDeployments' sub-resource of the 'domain' resource with my custom resource that has sync/async local/upload deploy/redeploy support). There are several kinds or resources—collection resource, collection child resource, singleton child resource, operation resource, create form resource.

In accordance with an embodiment, resource extensions (i.e. resources that are woven into the dynamic REST resources) can be written as JAX-RS resource classes that extend one of several internal base WLS REST resource classes. These base classes are designed to make it very easy for a resource to customize part of resource's behavior and inherit the rest.

In accordance with an embodiment, standalone resources (i.e. that are not woven into the dynamic REST resources) are written as normal JAX-RS resource classes. There are not WLS-REST-specific constraints.

In accordance with an embodiment, to initialize resources, a class can be written that implements the internal weblogic.management.rest.lib.utils.ResourceInitializer interface. It must have a no-arg constructor. The 'initialize' method can then be implemented and used to register stand-alone resources with JAXRS and your resource extensions with the WLS REST infra. The REST extension mechanism uses the java.util.ResourceLoader to locate the extension's initializer. A WEB-INF/classes/META-INF/services/weblogic.management.rest.lib.utils.ResourceInitializer file can be written that has a single line that contains the name of your resource initializer implementation class.

In accordance with an embodiment, an extension war can be created by compiling resource classes and resource initializer. A war file can then be created containing the resource class files (under WEB-INF/classes) along with weblogic.management.rest.lib.utils.ResourceInitializer (and web.xml and weblogic.xml if needed).

In accordance with an embodiment, an extension war can be deployed by copying the extension war either to the domain directory's 'management-services-ext' directory or to the kit's $WL_HOME/server/lib/management-services-ext' directory. This should be done on all of the domain's machines (since REST runs on both the admin and managed servers), and then all of the servers should be rebooted.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting RESTful management in an application server environment, comprising:
   one or more computers, including the application server environment executing thereon, together with a plurality of deployable resources usable within the application server environment;
   one or more partitions defined within the application server environment, wherein each partition provides an administrative and runtime subdivision of the domain; and
   a REST interface comprised of REST resources and configured to receive input for interacting with the application server environment,
   wherein when a request to manage the application server environment is received from a user having a role, the REST interface and the REST resources are dynamically generated based on the role using bean trees and other bean information within the application server environment,
   wherein where the role has access permissions that are limited to a partition from the one or more partitions, the REST resources dynamically generated are limited to managing the partition, and
   wherein input to the interface usable to manage the application server environment is defined by the dynamically generated REST resources.

2. The system of claim 1, wherein the application server environment is a cloud environment.

3. The system of claim 1, wherein the role has defined access permissions.

4. The system of claim 1, wherein the system is configured to dynamically describe a tree of beans that is returned in one call in response to a bulk access query.

5. The system of claim 1, further comprising:
   an extension mechanism configured to weave hand-coded REST resources and customization into trees of the dynamically generated REST resources.

6. The system of claim 1, wherein the application server environment includes an administration server and a plurality of managed servers;
   wherein when the REST resources are used as input to the interface to manage the application server environment, the interface interacts with the administration server; and
   wherein when the administration server is unavailable, the REST resources are usable to directly interact with a managed server from the plurality of manager servers.

7. A method for supporting RESTful management in an application server environment, comprising:

providing, at one or more computers, including an application server environment executing thereon, a plurality of deployable resources which can be used within the application server environment;

providing one or more partitions defined within the application server environment, wherein each partition provides an administrative and runtime subdivision of the domain;

providing a REST interface comprised of REST resources and configured to receive input for interacting with the application server environment;

dynamically generating, upon receiving a request to manage the application server environment from a user having a role, the REST interface and the REST resources based on the role using bean trees and other bean information within the application server environment, wherein where the role has access permissions that are limited to a partition from the one or more partitions, the REST resources dynamically generated are limited to managing the partition; and providing access to the REST resources, via the interface, to manage the application server environment as defined by the dynamically generated REST resources.

8. The method of claim 7, wherein the application server environment is a cloud environment.

9. The method of claim 7, further comprising:

providing one or more resource group templates within the application server environment, wherein each resource group template defines a grouping of the plurality of deployable resources within a domain of the application server environment, and wherein each resource group template includes one or more related applications together with resources upon which those applications depend, and wherein the REST resources are usable as input to the interface to manage the one or more related applications.

10. The method of claim 7, wherein the role has defined access privileges.

11. The method of claim 7, further comprising:

receiving a bulk access query at the interface; and dynamically describe a tree of beans that is returned in one call in response to receiving the bulk access query.

12. The method of claim 7, further comprising:

weaving hand-coded REST resources and customization into trees of the dynamically generated REST resources.

13. The method of claim 7, wherein the application server environment includes an administration server and a plurality of managed servers;

wherein when the REST resources are used as input to the interface to manage the application server environment, the interface interacts with the administration server; and wherein when the administration server is unavailable, the REST resources are usable to directly interact with a managed server from the plurality of manager servers.

14. A non-transitory computer readable storage medium, including instructions stored thereon which when read and executed by one or more computers cause the one or more computers to perform the steps comprising:

providing, at one or more computers, including an application server environment executing thereon, a plurality of deployable resources which can be used within the application server environment;

providing one or more partitions defined within the application server environment, wherein each partition provides an administrative and runtime subdivision of the domain;

providing a REST interface comprised of REST resources and configured to receive input for interacting with the application server environment;

dynamically generating, upon receiving a request to manage the application server environment from a user having a role, the REST interface and the REST resources based on the role using bean trees and other bean information within the application server environment, wherein where the role has access permissions that are limited to a partition from the one or more partitions, the REST resources dynamically generated are limited to managing the partition; and providing access to the REST resources, via the interface, to manage the application server environment as defined by the dynamically generated REST resources.

* * * * *

UNITED STATES PATENT AND TRADEMARK OFFICE
CERTIFICATE OF CORRECTION

PATENT NO.         : 10,015,242 B2
APPLICATION NO.    : 14/748011
DATED              : July 3, 2018
INVENTOR(S)        : Konkus et al.

Page 1 of 1

It is certified that error appears in the above-identified patent and that said Letters Patent is hereby corrected as shown below:

In the Specification

In Column 21, Line 52, delete "'rel" and insert -- 'rel' --, therefor.

In Column 25, Line 32, delete "adminstration" and insert -- administration --, therefor.

In Column 26, Line 14, delete "adminstration" and insert -- administration --, therefor.

Signed and Sealed this
Ninth Day of April, 2019

Andrei Iancu
*Director of the United States Patent and Trademark Office*